(12) United States Patent
Perez

(10) Patent No.: US 6,323,828 B1
(45) Date of Patent: Nov. 27, 2001

(54) COMPUTER VIDEO OUTPUT TESTING

(75) Inventor: Raphaël Perez, Grenoble (FR)

(73) Assignee: Hewlette-Packard Company, Palo Alto, CA (US)

( * ) Notice: Subject to any disclaimer, the term of this patent is extended or adjusted under 35 U.S.C. 154(b) by 0 days.

(21) Appl. No.: 09/274,917

(22) Filed: Mar. 23, 1999

(30) Foreign Application Priority Data

Oct. 29, 1998 (EP) .................................................. 98402731

(51) Int. Cl.$^7$ ........................... H04N 17/00; H04N 17/02
(52) U.S. Cl. ................................ 345/10; 345/11; 348/181
(58) Field of Search ............................. 345/10; 348/180, 348/181, 184, 192, 193, 189; 709/223

(56) References Cited

U.S. PATENT DOCUMENTS

| | | |
|---|---|---|
| 4,772,948 | 9/1988 | Irvin . |
| 4,780,755 | 10/1988 | Knierim . |
| 4,814,872 | 3/1989 | Ivie . |
| 4,894,718 | 1/1990 | Hung . |
| 4,974,080 * | 11/1990 | Fritchie et al. ........................ 358/139 |
| 5,051,816 * | 9/1991 | Harrison et al. ........................ 358/10 |
| 5,345,263 * | 9/1994 | Miller ................................... 348/182 |
| 5,440,339 * | 8/1995 | Harrison et al. ...................... 348/189 |
| 5,442,305 * | 8/1995 | Martin et al. ............................ 326/30 |
| 5,512,961 * | 4/1996 | Cappels, Sr. .......................... 348/658 |
| 5,793,421 * | 8/1998 | Koo ....................................... 348/181 |
| 5,798,790 * | 8/1998 | Knox et al. ............................ 348/191 |
| 5,835,134 * | 11/1998 | Thacker ................................ 348/180 |
| 5,923,322 * | 7/1999 | Kim ...................................... 345/204 |
| 5,943,029 * | 8/1999 | Ross ........................................ 345/11 |
| 5,943,092 * | 8/1999 | Chuang et al. ........................ 348/177 |
| 5,963,652 * | 10/1999 | Tran et al. ............................ 381/109 |
| 5,991,805 * | 11/1999 | Krukovsky ............................ 709/223 |
| 6,091,447 * | 7/2000 | Gershfeld ............................. 348/180 |

FOREIGN PATENT DOCUMENTS

29721762 * 4/1998 (DE) .............................. G01R/31/00

OTHER PUBLICATIONS

Automated Video Test Card with Self–Test Mechanisms: IBM Technical Disclosure Bulletin, vol. 32, Issue 5B, pp. 257–263, Oct. 1989.*

* cited by examiner

Primary Examiner—Steven Saras
Assistant Examiner—Srilakshmi Kumar

(57) ABSTRACT

A system is described for testing the video output of a computer of the type in which a video output connector is provided with a data channel, such as a DDC channel, permitting data to be transmitted from a monitor connected to the video output connector to the computer. The system comprises test apparatus having a connector for connection to the video output connector of a computer under test, the test apparatus comprising means to measure parameters of test video signals received through the connector and means to generate a result signal from the measured parameters for transmission to the computer under test over the data channel. Software executing on the computer under test to generate the test video signals and to receive and process the result signal received over the data channel.

6 Claims, 3 Drawing Sheets

COMPUTER VIDEO OUTPUT TESTING

FIELD OF THE INVENTION

The present invention relates to video output testing, particularly in personal computers.

BACKGROUND OF THE INVENTION

Generally personal computers must pass a number of manufacturing tests after the system is built to ensure their quality.

One aspect that must be tested is the video output. At present, the video output is usually tested by having a human engineer connect a monitor to the system unit and inspect by eye an image generated by the system under test and displayed on the monitor. The efficiency of this method is low and suffers from being somewhat subjective in that each engineer has their own judgement and vision. Thus the testing can be inconsistent and inaccurate.

Various automatic systems have been proposed to try and improve this situation, but these have certain drawbacks and are not thought to have been widely adopted.

For instance U.S. Pat. No. 4894718 describes a video signal testing system in which a cyclic redundancy check circuit is connected to a expansion slot of the computer and the video output. A value measured from a video signal is compared with a fixed value to justify the correctness of the signals without the use of the human eye. This system suffers from the disadvantage that since the unit is connected to an expansion slot of the computer under test, the test must either be carried out before the unit is fully assembled, or the unit must be dismantled in order to effect the test.

U.S. Pat. No. 5537145 discloses a system in which the image display ed on the monitor is measured by an optical testing unit and the result fed back to the system via an I/O subsystem. As well as suffering from the disadvantages set out above of having to connect to an expansion slot in the computer, this system also suffers from an inability to distinguish between problems related to the monitor itself and the circuitry within the computer under test which generates the video signals.

This invention is directed to overcoming the problems of the prior art by providing a simple and relatively cheap arrangement for testing the video output of a computer.

SUMMARY OF THE INVENTION

In brief, this is achieved by a system for testing the video output of a computer of the type in which a video output connector includes a data channel permitting data to be transmitted from a monitor connected to the video output connector to th e computer, the system comprising test apparat us having a connector for connection to the video output connector of a computer under test; the test apparatus comprising means to measure parameters of test video signals received through the connector and means to generate a result signal from the measured parameters for transmission to the computer under test over the data channel; and software for execution on the computer under test to generate the test video signals and to receive and process the result signal received over the data channel.

The invention makes use of the fact that the video output connector of a modern computer is provided with a data display channel. The VESA Display Data Channel (DDC) standards define a communications channel between a computer display and a host system. The channel is generally used to carry configuration information to allow optimum use of the display and may also carry display control information. In addition, it may be used as a data channel for accessing bus peripherals connected to the host via the display.

In at least a preferred implementation of the invention this Display Data Channel is used as a means to feedback measured test information from the video signal for processing by software running on the system under test. Of course application of this invention to other similar systems is not excluded. Only a very simple piece of extra hardware is required which simply plugs into the video output connector of a unit under test and does not require any additional connection to the computer. The tests can therefore be carried out on the final assembled computer product.

In a preferred embodiment, the test apparatus is arranged to derive power for its operational components from the video output connector, thereby obviating the need for separate power supply.

The test apparatus can have a video output connector and an operating mode in which signals from the connector are passed transparently to the video output connector. This enables a monitor to be connected to the unit which can be useful in monitoring the test process.

A switch can be provided for switching from a mode in which signals from the connector are passed transparently to the video output connector to a mode in which signals received from the connector are processed within the test apparatus, the switch being responsive to a signal received via the connector to switch between the modes. In the preferred embodiment, this signal is a predefined number of EDID read commands being received by the test apparatus within a predefined time.

The relatively low cost of the unit has the consequence that many of the units is use simultaneously at a plurality of final assembly stations as are typically used in modern personal computer final assembly. Units can also be used for off-site maintenance and testing of units in the field.

BRIEF DESCRIPTION OF THE DRAWINGS

A system embodying the invention will now be described, by way of non-limiting example, with reference to the accompanying diagrammatic drawings, in which.

BEST MODE OF CARRYING OUT THE INVENTION

Figure 1:
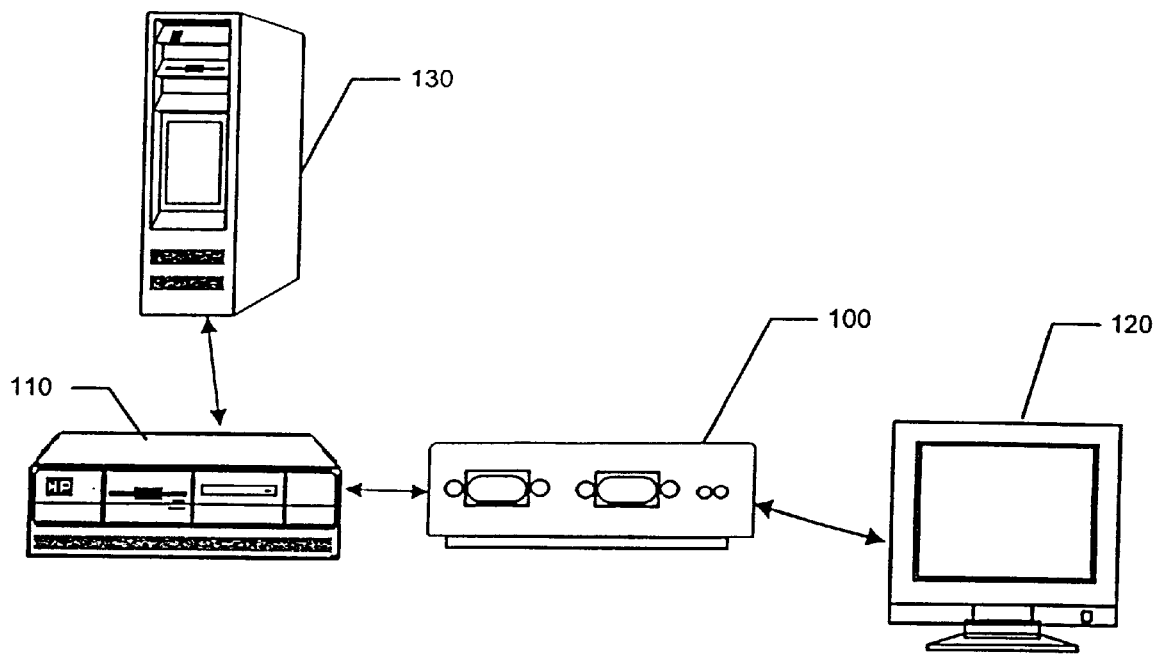
FIG. 1 shows a system for testing the video output of a computer.

FIG. 1 shows a system for testing the video output of a personal computer having a standard VGA video output. As shown in FIG. 1, a test unit 100 is connected to the VGA output connector of a personal computer system unit 110 under test, hereinafter referred as the unit under test (UUT). As will be described in more detail below, test unit 100 measures voltage and timing parameters of test video signals generated by software executing on UUT 110 and received through the VGA connector and generates a result signal from the measured parameters. The result signal is transmitted to UUT 110 over the DDC (Display data channel) within the VGA connector. Suitable software executing on UUT 110 receives, processes and stores the result signals received over the DDC data channel.

In a preferred embodiment, test unit 110 itself has a VGA output to which display monitor 120 is connected, although this is not essential. Also in the preferred embodiment, the whole process can be carried out as part of a larger test sequence which is supervised by a test controller 130. Another way is to use the test unit in a stand-alone process (ie without test controller 130). In this case UUT can send the test result itself to a printer or its monitor or any other external device.

Figure 2:
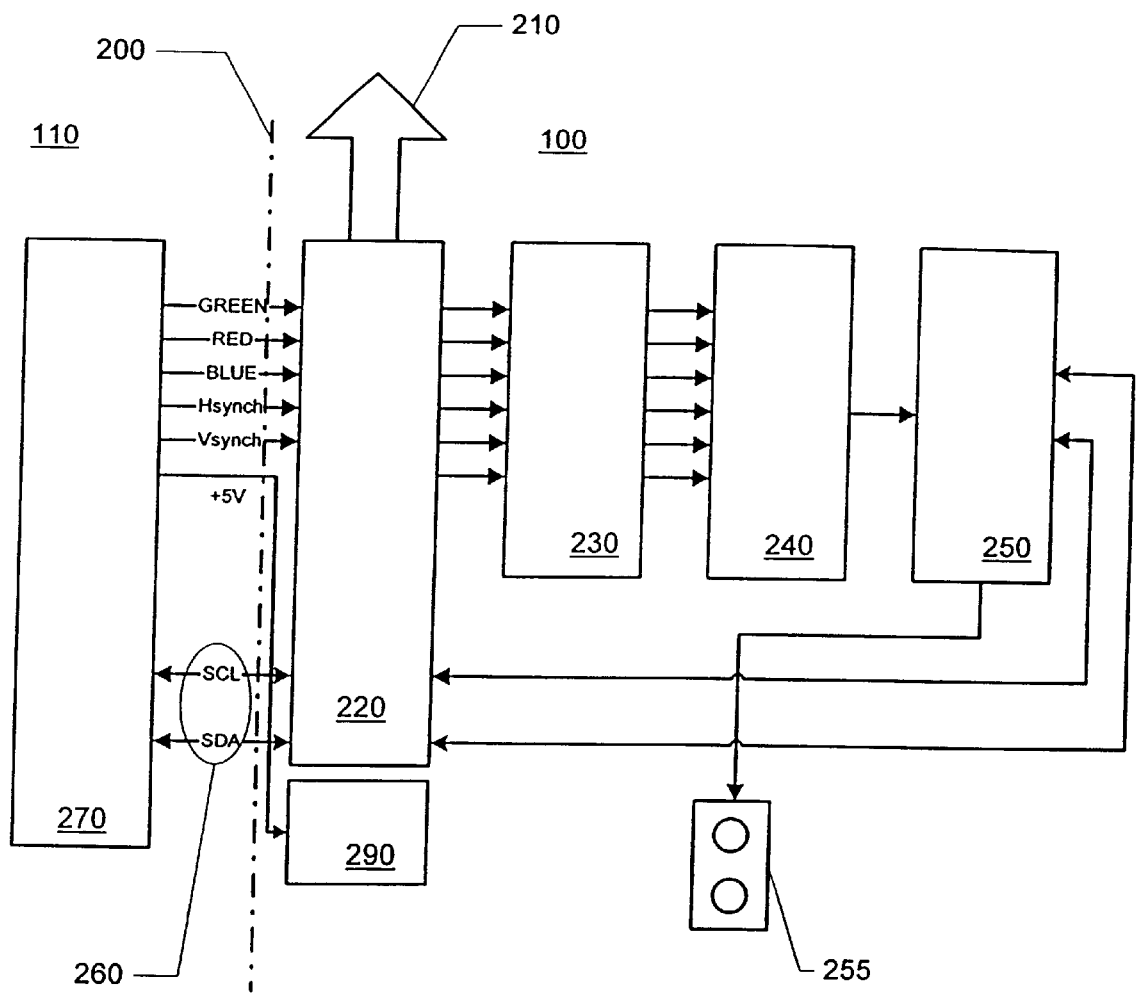
FIG. 2 is a schematic diagram showing the test unit of the system of FIG. 1.

FIG. 2 is a schematic diagram showing the functional elements of test unit 100 and UUT 110. Dashed line 200 represents the standard VGA connection between UUT 110 and the test unit 100. The standard VGA connection between test unit 100 and display monitor 120 is represented at 210. Test unit 100 comprises a switch 220 that functions to pass the VGA signals received by test unit 100 either directly to display monitor 120 or for analysis by the test unit. When test unit 100 is not enabled the VGA signals are passed in a transparent manner to VGA output 210 to enable monitor 120 to operate normally.

Selector/multiplexor 230 selects the VGA lines (when so switched by switch 220) for test and includes an analog to digital converter for measuring the analog colour signals.

The measurements are analysed and temporarily stored in analyser block 240. Analyser block 240 includes a suitably arranged microprocessor with associated ROM and RAM memory as well as other logic—in this embodiment implemented by a Field Programmable Gate array (FPGA).

Output block 250 arranges the results in EDID data block so that they are available to UUT 110 via DDC data channel 260.

Test unit 100 also includes output LEDs 255 to indicate status to an operator and a power supply supervisor unit 290 which takes power for the unit from the +5V line in the VGA connector, thereby obviating the need for a separate power supply within the unit.

In FIG. 2 the function of the test software that runs on UUT 110 is represented at 270. There are five main functions:
1. The generation to the video signals to be tested, including configuration of conventional display parameters such as video resolution, number of colours, refresh rate and luminance level;
2. The establishment of the communication protocol between test unit 100 and UUT 110 and
3. The processing of the results received from test unit 100;
4. The management of the I2C protocol used by the DDC;
5. Devalidation of test unit 100.

The basic test process is as follows. An operator plugs the test unit 100 in the VGA output of UUT 110 and powers on UUT 110.

The software running on UUT 110 then generates a test pattern which is displayed on display monitor 120. In response to a predefined signal received from UUT 110 and detected within switch 220 of test unit 100, the switch then shuts off the VGA signals to display monitor 120 and launches a series of measurements of the video signal received through the unit under test. The measurements are downloaded from test unit 100 as they are completed. Each measurement is checked against predefined tolerances for the parameter concerned by the software running on UUT 110 and the result(PASS or FAIL) is transmitted to test controller 130 in the form of a DOS error. A report file is stored on UUT 110 for subsequent fault diagnosis if required.

Figure 3:
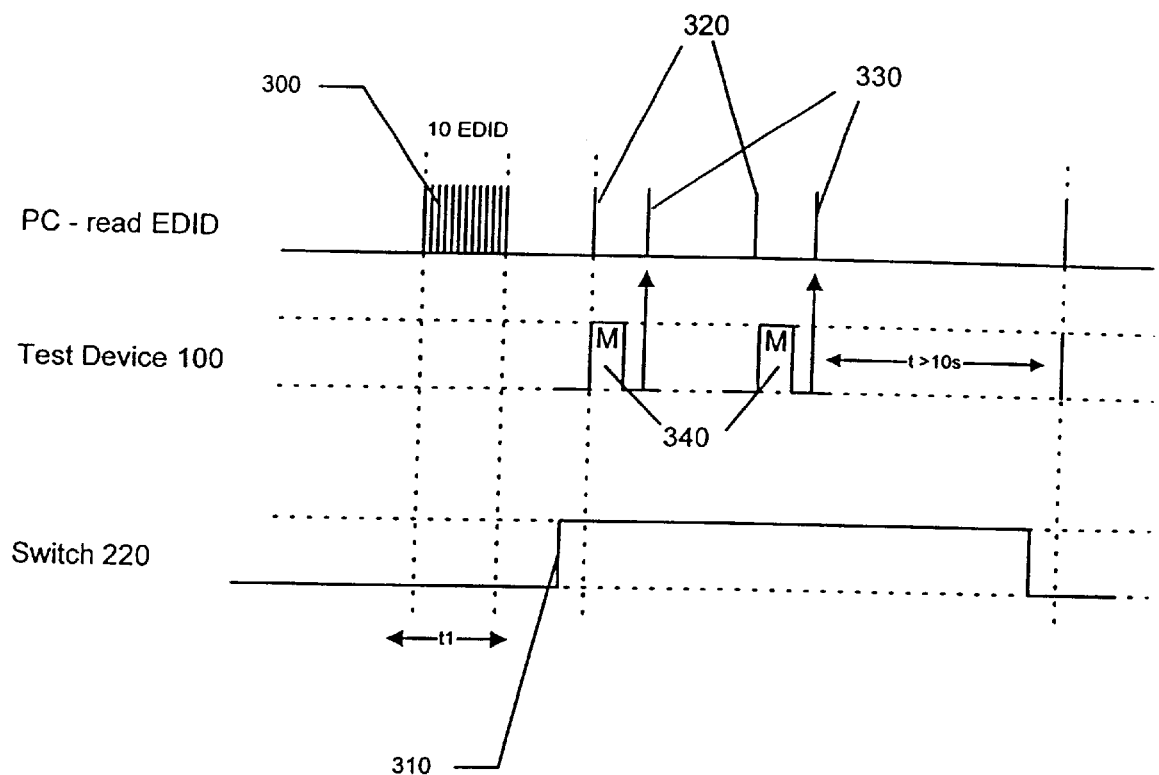
FIG. 3 is a timing diagram showing the operation of the test unit of the system of FIG. 1.

This general process is shown in the timing diagram of FIG. 3. In the preferred embodiment, the signal which is used to launch the test process is the receipt of 10 closely spaced EDID read signals within a predefined time period t1. These signals are shown at 300. Upon detection of this signal, switch 220 switches to direct the VGA signals to selector/multiplexor 230. This transition is indicated at 310.

Each separate measurement is initiated by a further read EDID signal sent by the UUT 110—these signals are indicated at 320. The results of the measurements are retrieved by interleaved read EDID signals indicated at 330. Once all the measurements are complete, switch 220 redirects the VGA signals back to monitor 120.

As is well known, the VGA video output comprises 5 signals: three analog colour signals (red, green, blue) and two synchronisation signals. In addition there is a +5V power line. The luminance of the screen is directly proportional to the amplitude of the RGB signals. The synchronisation signals guarantee the stability and the form of the image.

The DDC bus is a bus based on the well-known I2C protocol and comprises two signal lines denoted SDA which carries DDC data and SCL which carries a clock signal.

The analog RGB signals have voltages within the range 0V to 0.7V, 0.7V corresponding to the maximum intensity. The Vsynch and Hsynch signals are TTL signals whose frequency can vary between 60 Hz and 100 Hz according to the video card within the PC.

The measurements performed by test unit 100 are as follows:

Red, Green, Blue signals—Test unit 100 makes the range measurement in the useful part of video line between the beginning and the end of the video line. Range measurements are performed for a cluster of 128 lines from the beginning of the field. The test pattern and the synchronization of the measurements and the generation of the test pattern are arranged so as to enable each discrete voltage level of the RGB signals to be measured and recorded.

I2C/SDA signal—This signal, the data line of the I2C/DDC bus, is "or wired" and TTL level. For this signal the low level and high level voltages are measured by the test unit 100 when SDA signal is driven by UUT 110. Test unit 100 performs only one measurement per test sequence.

Signal I2C/SCL—This signal, the clock of I2C/DDC bus, is TTL level and driven by the UUT. Low level and high level voltages are measured when the SCL signal is driven by the UUT. Only one measurement is performed per test sequence.

Signal I2C/+5V—This is the DC power source delivered by the UUT to test unit 100. Test unit 100 performs only one measure of level voltage per test sequence. If the voltage is under 4.7V, no measurement can be performed because the test unit 100 will be in RESET state and not running.

Signal Vsync—This signal, the video frame vertical synchronization, is TTL level and driven by UUT. Low level and high level voltages are measured by the test unit 100. Only one measurement is performed per test sequence. This signal can have positive or negative logic level depending on the video format. A time measurement is performed between two consecutive falling edges of the VSync signal.

Signal Hsync—This signal, video frame horizontal synchronization, is TTL level and driven by UUT 110. Low level and high level voltages are measured by the test unit 100 and only one measurement is performed per test sequence. The scale of the result is mV. This signal can have positive or negative logic level depending on the video format. The cycle time is also measured between two consecutive falling edges of the Hsync signal. To have an accurate cycle time, test unit 100 measures 128 consecutive Hsync cycles.

LEDs 255 indicate the power and testing states as follows:
A Red LED indicates power as follows:

| | |
|---|---|
| switched off | +5 V power from VGA IN is off; |
| switched on | +5 V power from VGA IN is on; |

A Yellow LED only works if the Red LED is on and indicates the state of test unit 100 as follows:

| | |
|---|---|
| switched off | test unit 100 is waiting because +5 V power < 4.7 V or autotest fault; |
| switched on | test unit 100 is running but not enabled |
| fast flashed on | test unit 100 is running and enabled- testing is in progress |

The data stream from test unit 100 to UUT 110 uses the Extended Data Information Display (EDID) block of the DCC protocol. This stream contains each measured parameter as shown below:

| Address | Format | Unit | Data mnemonic | Data description |
|---|---|---|---|---|
| 0 | Char | | 0x00 | Header |
| 1 to 6 | Char | | 0xFF | Header |
| 0 | Char | | 0x00 | Header |
| 8 | unsigned short | | ID_PRODUCT | Identifier of test unit 100 0x4EC8 |
| 10 | unsigned short | | SERIAL_NB | Serial number of test unit 100 |
| 12 | unsigned short | | VERSION | data stream Version-Revision |
| 14 | unsigned short | mV | HS_LOW_V | Horizontal Synchronization Low level Voltage |
| 16 | unsigned short | mV | HS_HIGH_V | Horizontal Synchronization High level Voltage |
| 18 | unsigned short | mV | VS_LOW_V | Vertical Synchronization Low level Voltage |
| 20 | unsigned short | mV | VS_HIGH_V | Vertical Synchronization High level Voltage |
| 22 | unsigned short | mV | SDA_LOW_V | Data DDC/I2C signal Low level Voltage |
| 24 | unsigned short | mV | SDA_HIGH_V | Data DDC/I2C signal High level Voltage |
| 26 | unsigned short | mV | SCL_LOW_V | Clock DDC/I2C signal Low level Voltage |
| 28 | unsigned short | mV | SCL_HIGH_V | Clock DDC/I2C signal High level Voltage |
| 30 | unsigned short | mV | VCC_V | VCC power supply Voltage |
| 32 | unsigned short | µs | VS_P | Vertical Synchronization period |
| 34 | unsigned short | ns | HS_P | Horizontal Synchronization period (total for 128 line) |
| 36 | boolean | | VS_HS_POL | Bit 1 ->Vertical Synchronization Polarity Bit 2 -> Horizontal Synchronization Polarity Polarity : 0 = NEG, 1 = POS |
| 40 | | | BLOCK 0 | beginning of block0 |

-continued

| Address | Format | Unit | Data mnemonic | Data description |
|---|---|---|---|---|
| 40 | unsigned short | mV | RED_LEVEL | Red level voltage |
| 42 | unsigned short | mV | GREEN_LEVEL | Green level voltage |
| 44 | unsigned short | mV | BLUE_LEVEL | Blue level voltage |
| 46–51 | | | BLOCK 1 | as block0 |
| 52–57 | | | BLOCK 2 | as block0 |
| 58–63 | | | BLOCK 3 | as block0 |
| 64–69 | | | BLOCK 4 | as block0 |
| 70–75 | | | BLOCK 5 | as biock0 |
| 76–81 | | | BLOCK 6 | as block0 |
| 82–87 | | | BLOCK 7 | as block0 |
| 88–93 | | | BLOCK 8 | as block0 |
| 94–99 | | | BLOCK 9 | as block0 |
| 127 | | | CHECKSUM | |

The operations the data analysis part of the program is as follows:
   Configuration values are read from a configuration file svh.ini.
   Measured parameters are read from the block EDID.
   Each measured parameter is compared with the configuration values.
   The results are written in a report.
   a DOS error code is returned.

The svh.ini file contains the maximum and the minimum value for each parameter in a suitable format as well a flag which can be set to indicate that parameter should or should not be tested.

It will be appreciated that many variations are possible within the scope of the attached claims. For example, test unit 100 may be integrated as part of the monitor or within a personal computer to provide a self-test functionality. Many variations of the parameters measured are possible and these may be analysed in different ways.

What is claimed is:

1. A system for testing the video output of a computer of the type in which a video output connector is provided with a data channel permitting data to be transmitted from a monitor connected to the video output connector to the computer, the system comprising:

test apparatus having a connector for connection to the video output connector of a computer under test, the test apparatus comprising means to measure parameters of test video signals received through the connector and means to generate a result signal from the measured parameters for transmission to the computer under test over the data channel; and software for execution on the computer under test to generate the test video signals and to receive and process the result signal received over the data channel wherein the test apparatus is arranged to derive power for its operational components from the video output connector.

2. A system as claimed in claim 1, wherein the test apparatus has a video output connector and an operating mode in which signals from the connector are passed transparently to the video output connector.

3. A system as claimed in claim 2 wherein the test appratus comprises a switch for switching from a mode in which signals from the connector are passed transparently to the video output connector to a mode in which signals received from the connector are processed within the test.

4. A system as claimed in claim 3 wherein the signal is a predefined number of read commands being received by the test apparatus within a predefined time.

5. A system as claimed in claim 1, wherein at least some of the parameters measured are voltages.

6. A system as claimed in claim 1, wherein at least some of the parameters measured are frequencies.

* * * * *

UNITED STATES PATENT AND TRADEMARK OFFICE
CERTIFICATE OF CORRECTION

PATENT NO.   : 6,323,828 B1
DATED        : November 27, 2001
INVENTOR(S)  : Raphael Perez It is certified that error appears in the above-identified patent and that said Letters Patent is hereby corrected as shown below:

<u>Title page,</u>
Item [73], change the Assignee's name from "Hewlette-Packard Company" to -- Hewlett-Packard Company --.
Item [73], change the Foreign Application Priority Data from "98402731" to -- 98402731.8 --

Signed and Sealed this

Sixteenth Day of July, 2002

Attest:

Attesting Officer

JAMES E. ROGAN
*Director of the United States Patent and Trademark Office*